United States Patent
May

(10) Patent No.: US 8,219,789 B2
(45) Date of Patent: Jul. 10, 2012

(54) INTERFACE PROCESSOR

(75) Inventor: Michael David May, Bristol (GB)

(73) Assignee: XMOS Ltd., London (GB)

( * ) Notice: Subject to any disclaimer, the term of this patent is extended or adjusted under 35 U.S.C. 154(b) by 1516 days.

(21) Appl. No.: 11/717,622

(22) Filed: Mar. 14, 2007

(65) Prior Publication Data

US 2008/0229311 A1  Sep. 18, 2008

(51) Int. Cl.
*G06F 9/00* (2006.01)
*G06F 9/30* (2006.01)

(52) U.S. Cl. .................. 712/228; 712/229

(58) Field of Classification Search ............ 712/10, 712/16, 228, 229
See application file for complete search history.

(56) References Cited

U.S. PATENT DOCUMENTS

| | | | |
|---|---|---|---|
| 5,515,538 A | 5/1996 | Kleiman | |
| 6,661,794 B1 * | 12/2003 | Wolrich et al. | 370/394 |
| 6,799,317 B1 | 9/2004 | Heywood et al. | |
| 6,947,425 B1 * | 9/2005 | Hooper et al. | 370/394 |
| 6,952,824 B1 * | 10/2005 | Hooper et al. | 718/100 |
| 6,976,095 B1 * | 12/2005 | Wolrich et al. | 709/250 |
| 7,203,100 B2 * | 4/2007 | Kant et al. | 365/185.14 |
| 7,321,595 B2 * | 1/2008 | Kim et al. | 370/416 |
| 7,434,221 B2 * | 10/2008 | Hooper et al. | 718/100 |
| 7,480,706 B1 * | 1/2009 | Hooper et al. | 709/223 |
| 7,610,473 B2 * | 10/2009 | Kissell | 712/235 |
| 7,751,402 B2 * | 7/2010 | Wolrich et al. | 370/394 |
| 8,020,169 B2 * | 9/2011 | Yamasaki | 718/108 |
| 2002/0091956 A1 * | 7/2002 | Potter et al. | 713/324 |
| 2002/0161957 A1 | 10/2002 | Comeau et al. | |
| 2003/0065741 A1 * | 4/2003 | Vo | 709/217 |
| 2003/0219027 A1 * | 11/2003 | Kim et al. | 370/419 |
| 2004/0215939 A1 | 10/2004 | Armstrong et al. | |
| 2004/0216102 A1 * | 10/2004 | Floyd | 718/100 |
| 2006/0117325 A1 | 6/2006 | Wieland et al. | |
| 2006/0294520 A1 * | 12/2006 | Anderson | 718/100 |
| 2007/0022428 A1 * | 1/2007 | Yamasaki | 718/108 |
| 2007/0266206 A1 * | 11/2007 | Kim et al. | 711/118 |
| 2008/0134180 A1 * | 6/2008 | Floyd | 718/100 |

FOREIGN PATENT DOCUMENTS

WO   9744732 A1   11/1997

OTHER PUBLICATIONS

European Office Action corresponding to European Patent Application No. 08718712.6, dated Mar. 1, 2011.
International Search Report and Written Opinion, dated Jun. 18, 2008.

* cited by examiner

*Primary Examiner* — Aimee Li
(74) *Attorney, Agent, or Firm* — Sughrue Mion, PLLC

(57) ABSTRACT

The invention provides a processor comprising a first port operable to generate a first indication dependent on a first activity at the first port, and a second port operable to generate a second indication dependent on a second activity at the second port. The processor also comprises an execution unit arranged to execute multiple threads; and a thread scheduler connected to receive the indications and arranged to schedule the multiple threads for execution by the execution unit based on those indications. The scheduling includes suspending the execution of a thread until receipt of the respective ready signal. The first activity and the second activity are each associated with respective corresponding threads.

56 Claims, 9 Drawing Sheets

INTERFACE PROCESSOR

FIELD OF THE INVENTION

The present invention relates to an interface processor, that is a processor which is particularly but not exclusively for interfacing with other processors or external devices.

BACKGROUND OF THE INVENTION

One of the challenges facing processor designers is the handling of an ever-increasing number of external devices which wish to communicate with the processor. Generally this is done by providing some kind of interrupt handling capability for the processor for handling activity arising at ports connected to external devices. Increasingly, more sophisticated interface logic is used at these ports to deal with, for example, multiple external devices per port.

Interfacing is needed in a wide variety of different contexts. One context which is discussed herein by way of a background example is in mobile applications processing.

FIG. 1 shows an exemplary application of a mobile applications processor 2. The applications processor 2 comprises a CPU 4 and a plurality of interface controllers 6 which interface with a plurality of peripheral devices 8. The interface controllers include: a memory controller 6a for interfacing with a hard-drive (HDD) 8a and a SDRAM memory 8b; a video controller 6b for interfacing with a camera 8c; a display controller 6c for interfacing with an LCD display 8d; an audio controller 6d for interfacing with a microphone 8e, speaker 8f and headset 8g; and a connectivity controller 6e for interfacing with a keyboard 8h, a Universal Serial Bus (USB) device 8i, a Secure Digital (SD) card 8j, a Multi-Media Card (MMC) 8k, and a Universal Asynchronous Receiver/Transmitter (UART) device 8l. The interface controllers 6 are typically connected to the CPU 4 via a bus 3. The system also comprises a power controller 10 and radio processor 12.

Note that the interface controllers 6 are shown somewhat schematically, but represent generally some kind of dedicated I/O logic or specially configured ports.

Conventionally, external interfacing is achieved either using interrupts or by polling. When interrupts are used, an external peripheral device sends a signal to inform the processor either that it has data ready to input to the processor or that it requires data from the processor. When polling is used, the processor continually checks the state of the device to determine whether or not it is ready to supply or accept data.

One possibility for implementing an applications processor 2 such as that of FIG. 1 is to use an Application Specific Integrated Circuit microcontroller (ASIC). ASICs are hard-wired devices possibly including microprocessors dedicated to a particular application and optimised to suit that application. For a given function, they are generally cheaper and consume less power than other options. However, they are complex to design, must be pre-designed and cannot readily be reconfigured.

Another possibility is to use Field Programmable Gate Array (FPGA) devices. FPGAs are semiconductor devices that can be configured "in the field" after manufacture. To configure an FPGA, first a computer is used to model the desired logical functions, for example by drawing a schematic diagram or creating a text file describing the functions. The FPGA comprises an array of look-up tables which communicate via statically configured interconnects. The computer model is compiled using software provided by the FPGA vendor, which creates a binary file that can be downloaded into the FPGA look-up tables. This allows manufacturers of equipment to tailor the FPGA to meet their own individual needs.

In this example, the interface controllers 6 are implemented as FPGAs. This has the benefit that the manufacturer of the mobile telephone can purchase generic FPGA devices 2 and then configure them on site (i.e. "in the field") to be specific to their desired application. The disadvantage of FPGAs however is that they are more expensive, slower and consume more power than ASICs.

In alternative examples, the whole chip 2 could be implemented in FPGA, or the chip 2 could be a general purpose processor with separate FPGA chips connected between the chip 2 and the respective peripherals 8. However, these options would be even more expensive and power-consuming—prohibitively so for most mobile phones and other consumer devices.

It would be advantageous to achieve the configurability of an FPGA but with the price, speed, scope and energy consumption levels of an ASIC.

SUMMARY OF THE INVENTION

According to one aspect of the invention, there is provided a processor comprising: a first port operable to generate a first indication dependent on a first activity at the first port; a second port operable to generate a second indication dependent on a second activity at the second port; an execution unit arranged to execute multiple threads; and a thread scheduler connected to receive said indications and arranged to schedule said multiple threads for execution by the execution unit based on said indications, said scheduling including suspending the execution of a thread until receipt of the respective indication; wherein the first activity and the second activity are each associated with respective corresponding threads.

Because each of the threads is associated with activity at a respective port, and the thread scheduler is connected to suspend the threads pending indications of that activity, then the processor is advantageously "primed" to respond quickly to activity occurring at the ports. The present invention thus provides a substantial improvement in applications where fast response to external stimuli is desired. Further, while the thread is suspended, if other threads are still to be scheduled then the thread scheduler can begin to schedule those threads.

This suspended-thread approach is preferable to the use of interrupts when fast reaction time is required. Using suspended threads, the thread scheduler can prepare to execute a thread in expectance of the associated activity, which as discussed above means the processor is ready to react. In contrast, using interrupts, the execution unit is interrupted by a signal from an external device whilst executing some potentially unrelated code. In the interrupt case, the current program state must be saved before the interrupt can be acted upon. The reaction time using interrupts is therefore much slower. Polling is less energy efficient because of the continual queries and responses required.

The thread scheduler may be arranged to transmit, to an identifier register associated with the first port, a first thread identifier relating to a first thread suspended awaiting the first event. The thread scheduler may be arranged to transmit, to an identifier register associated with the second port, a second thread identifier relating to a second thread suspended awaiting the second event. In such embodiments, the thread scheduler is adapted to manage the execution of the threads, but when it encounters an instruction within a thread which is conditional on certain activity then the thread scheduler can advantageously "set aside" the thread by passing responsibility for it to the respective port with which it is associated. This also aids reaction time.

The thread scheduler may be arranged to transmit, upon suspending said first thread, a continuation point vector to a vector register associated with the first port; and the continuation point vector may be returned to the execution unit in dependence on the first activity. A continuation point vector identifies a point in the code where execution should be continued upon occurrence of the respective activity. This may advantageously allow additional responsibility for the thread to be transferred to the port, and may free up instruction buffers which need not be kept filled with pending instructions.

Further, the use of continuation point vectors may allow multiple activities (or events) to be handled per thread. Thus, the first thread may be associated with activity from a plurality of ports, each operable to generate a respective indication in dependence on that activity; the execution unit may be adapted to transmit a plurality of continuation point vectors each to a respective one of said plurality of ports, a respective continuation point vector being returned in dependence on the respective activity; and the thread scheduler may be adapted to suspend the execution of the first thread until receipt of at least one of the respective indications.

The processor may be adapted to power down at least one of the execution unit, the thread scheduler and a clock once all thread identifiers of suspended threads have been transmitted to ports. The processor may be adapted to power up said at least one of the execution unit, thread scheduler and clock upon return of at least one of the thread identifiers from its respective port. Thus if all threads have been de-scheduled and handed to a respective port in pursuance of their respective activity, then the processor can be adapted to power down some or all of the components until one of the activities occurs. This greatly improves the power consumption of the system.

At least one of the first and second ports may comprise activity handling logic and be associated with at least one condition register for storing a condition, the activity handling logic being arranged to monitor the activity at the port and to generate said indication in dependence on said activity fulfilling said condition. The execution unit may be arranged to transmit a respective condition to each condition register. Advantageously, this improves the generality of the system by allowing the thread scheduler to provide conditions to the ports, so that the ports can handle more specific and diverse types of condition.

A port event enable flag may be associated with the first port; and the thread scheduler may be adapted to enable said first activity to trigger said scheduling by asserting the port event enable flag, and to disable the first activity from triggering said scheduling by de-asserting the port event enable flag. A thread event enable flag may be associated with the first thread; and the thread scheduler may be adapted to enable the first thread to be scheduled in dependence on the first activity by asserting the thread event enable flag, and to disable the first thread from being scheduled in dependence on the first activity by de-asserting the thread event enable flag. The thread scheduler may be adapted to suspend execution of the first thread pending a third indication of a third activity from a port whilst at least one of the port event enable flag and the thread event enable flag is de-asserted.

At least one of the port event enable flag and the thread event enable flag may be de-asserted automatically by occurrence of the first activity.

A plurality of respective port event enable flags may be associated with each of the plurality of ports associated with the first thread; and the thread scheduler may be arranged to assert the thread enable flag and to subsequently assert said plurality of port event enable flags.

The processor may comprise program memory connected to the execution unit by a bus, wherein the thread scheduler is connected to receive said indications from each of the first and second ports by at least one connection separate from said bus. This removes the need for bus arbitration in the communication between ports and thread scheduler, thus further improving the reaction time of the processor.

The processor may comprise a plurality of sets of thread registers, each set of thread registers being allocated to store information relating to a respective one of said multiple threads. The processor may comprise at least one channel between at least two of said sets, and the thread scheduler may be adapted to schedule a thread based on activity occurring over said channel.

The processor may be implemented on a chip. At least one of said first and second ports may be an internal port for communicating with another processor on said chip. At least one of said first and second ports may be an external port for communicating with a device external to said chip. At least one external port may be a pin port for detecting rising or falling signal edges occurring at a pin at the chip's physical boundary. At least one external port may be a data port for handling an instantaneous logic-level of one or more bits at the port.

The execution unit may be adapted to recognise and execute dedicated instructions for suspending and running threads.

The thread scheduler may be further adapted to schedule a thread based on an interrupt. The thread scheduled based on the interrupt is the first thread, and the interrupt interrupts the first thread whilst suspended.

The thread scheduler may be adapted to schedule a thread without suspension if an associated activity occurs on or before execution of an instruction within that thread which is dependent on that activity.

According to a further aspect of the invention, there is provided a method of scheduling multiple threads for execution within a processor having a first port and a second port, the method comprising: associating respective corresponding threads with a first activity at the first port and a second activity at the second port; generating a first indication at the first port in dependence on the first activity; generating a second indication at the second port in dependence on the second activity; scheduling the threads for execution based on said indications, said scheduling including suspending the execution of a thread until receipt of the respective indication; and running the threads by executing them in dependence on said scheduling.

According to another aspect of the invention, there is provided a port for use in the scheduling of multiple threads for execution, the port comprising: activity handling logic arranged to generate an indication dependent on activity at the port, a register for storing information identifying a thread associated with said activity, and a register for storing a condition; wherein the activity handling logic is adapted to transmit the first indication on chip when said activity meets said condition.

According to another aspect of the invention, there is provided a thread scheduler for scheduling multiple threads for execution within a processor having a first port and a second port, wherein: the thread scheduler is adapted to receive a first indication generated by the first port dependent on a first activity at that first port; the thread scheduler is adapted to receive a second indication generated by the second port dependent on a second activity at that second port; and the thread scheduler is adapted to schedule said multiple threads for execution by the execution unit based on said indications, said scheduling including suspending the execution of a thread until receipt of the respective indication; wherein the first activity and the second activity are each associated with respective corresponding threads.

According to another aspect of the invention, there is provided a mobile terminal having a mobile applications processor, at least one peripheral device, and an interface processor connected between the mobile applications processor and the peripheral device, the interface processor comprising: a first port operable to generate a first indication dependent on a first activity at the first port; a second port operable to generate a second indication dependent on a second activity at the second port; an execution unit arranged to execute multiple threads; and a thread scheduler connected to receive said indications and arranged to schedule said multiple threads for execution by the execution unit based on said indications, said scheduling including suspending execution of a thread until receipt of the respective indications; wherein the first activity and the second activity are each associated with respective corresponding threads.

According to another aspect of the invention, there is provided an array of interconnected processors, at least one of said processors comprising: a first port operable to generate a first indication dependent on a first activity at the first port; a second port operable to generate a second indication dependent on a second activity at the second port; an execution unit arranged to execute multiple threads; and a thread scheduler connected to receive said indications and arranged to schedule said multiple threads for execution by the execution unit based on said indications, said scheduling including suspending the execution of a thread until receipt of the respective indications; wherein the first activity and the second activity are each associated with respective corresponding threads; and at least one of said first and second ports connects said at least one processor with another processor in the array.

For a better understanding of the present invention and to show how the same may be carried into effect, reference will now be made, by way of example, to the corresponding drawings.

DETAILED DESCRIPTION OF THE DRAWINGS

DETAILED DESCRIPTION OF THE PREFERRED EMBODIMENTS

Figure 1:
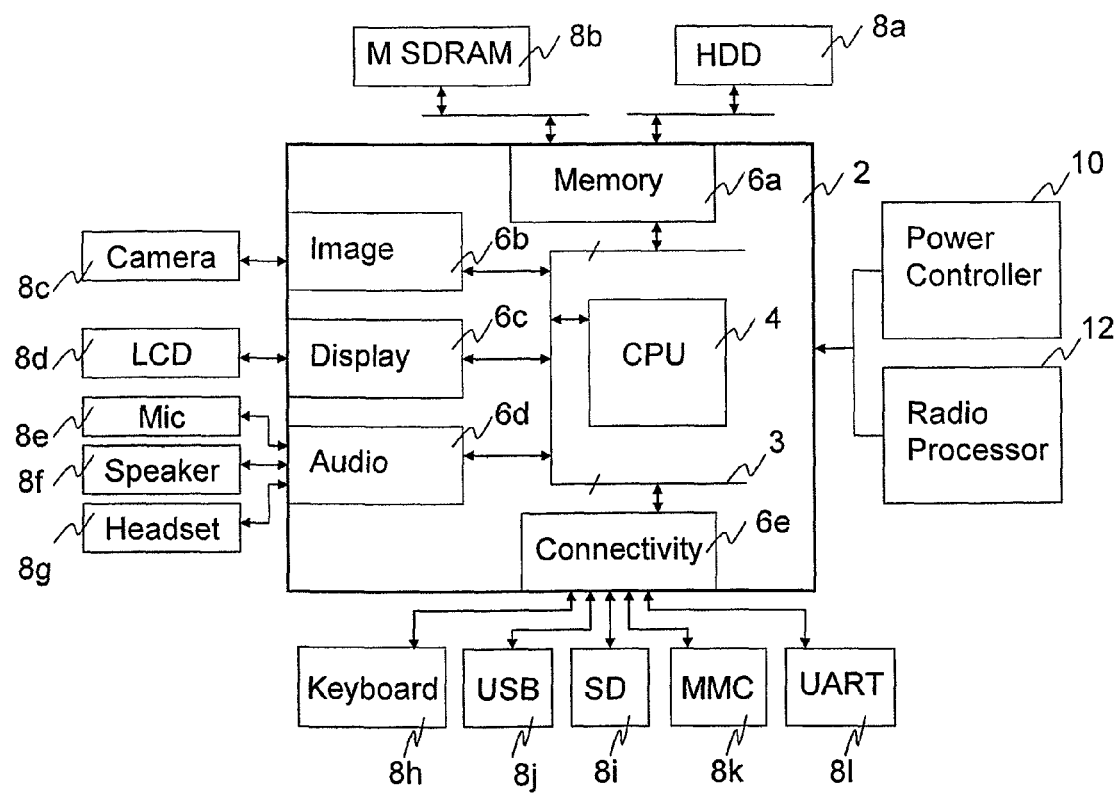
FIG. 1 illustrates an example application of an FPGA device as is known in the art.
Figure 2:
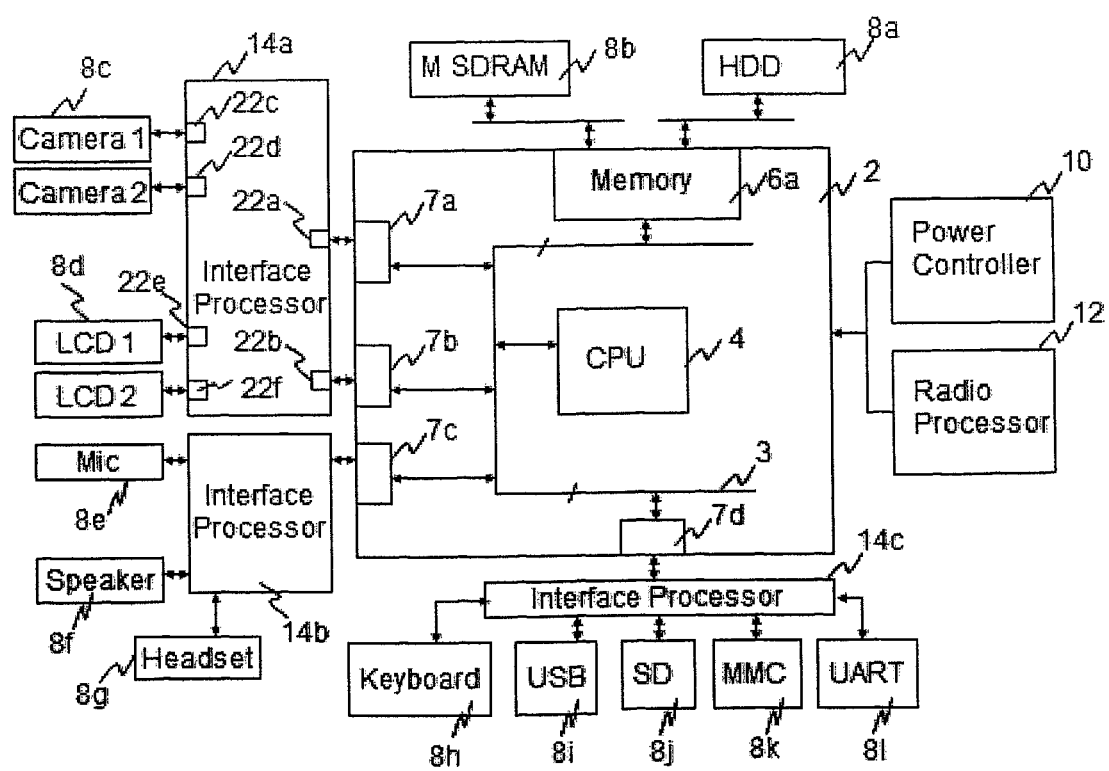
FIG. 2 illustrates an example application of an interface processor.

FIG. 2 shows an exemplary application of interface processors in a mobile telephone. The mobile applications processor 2 needs to communicate with the plurality of peripheral devices 8. As in FIG. 1, the applications processor 2 comprises a bus 3, a CPU 4, and a memory controller 6a for interfacing with a hard-drive (HDD) 8a and a SDRAM memory 8b, as well as a power controller 10 and radio processor 12.

However, in place of dedicated controllers 6, the arrangement of FIG. 2 allows the CPU 4 to communicate externally via generic ports 7. In this example, generic ports 7a and 7b are provided for interfacing with cameras 8c and LCD displays 8d; a generic port 7c is provided for interfacing with a microphone 8e, speaker 8f and headset 8g; and a generic port 7d is provided for interfacing with a keyboard 8h, a Universal Serial Bus (USB) device 8i, a Secure Digital (SD) card 8j, an Multi-Media Card (MMC) 8k, and a Universal Asynchronous Receiver/Transmitter (UART) device 8l.

In FIG. 2, interface processors 14a, 14b and 14c are placed at the outputs of the relevant ports 7, with a first interface processor 14a being connected between the image devices 8c-8d and the generic ports 7a-7b, a second interface processor 14b being connected between the audio devices 8e-8g, and a third interface processor 14b being connected between the generic port 7d and the various connectivity devices 8h-8m. The ports 7 need only be general purpose ports because the application-specific display, audio and connectivity functions are implemented by the interface processors 14a-14c in a manner to be described later. The ports 7 need not use FPGA logic, because the interface processors 14 provide the flexibility and configurability that would otherwise be provided by FPGAs. The interface processor 14a has ports 22a and 22b connected to the ports 7a and 7b, and ports 22c, 22d, 22e and 22f connected to the external devices 8c and 8g. The interface processors 14b and 14c have similar ports, not shown in FIG. 2.

The interface processors are typically involved in implementing the specific protocols used to transfer data via the interfaces, re-formatting data including converting it between parallel and serial formats, and possibly higher level functions such as encoding it, compressing it or encrypting it.

Figure 2A:
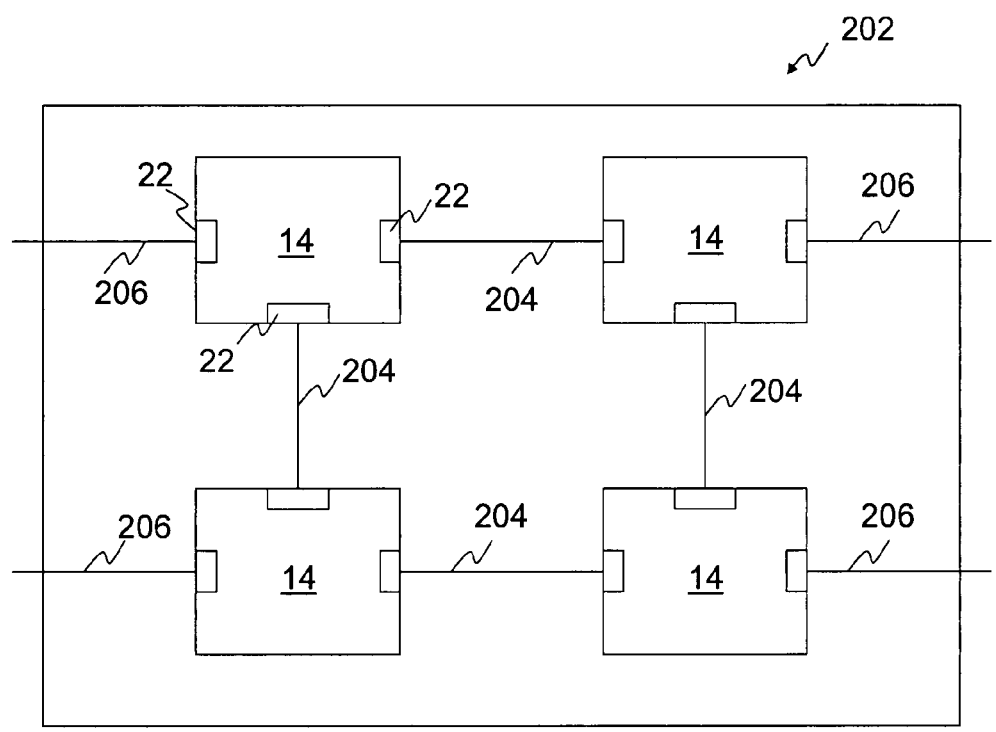
FIG. 2a illustrates another example application of an interface processor.

Another application of an interface processor is as a tile in a multiprocessor chip 202 illustrated in FIG. 2a. Such a chip 202 uses a high performance interconnect 204 which supports communication between the processors 14 on the chip 202, and inter-chip links 206 so that systems can easily be constructed from multiple chips. Each processor 14 is connected to its inter-chip link 206 and high performance interconnects 204 via ports 22.

An important feature of the interface processor which is discussed more fully in the following is its ability to manage activity at the ports 22. Each interface processor comprises a CPU, memory and communications. To allow the direct and responsive connectivity between the CPU and the ports, each processor has hardware support for executing a number of concurrent program threads, each comprising a sequence of instructions, and at least some of which are specifically responsible for handling activity at the ports. As will be discussed more fully in the following, the hardware support includes:
  a set of registers for each thread,
  a thread scheduler which dynamically selects which thread to execute,
  a set of ports used for input and output (ports 22), The use of a small set of threads on each processor can be used to allow communications or input/output to progress together with other pending tasks handled by the processor, and to allow latency hiding in the interconnect by allowing some threads to continue whilst others are suspended pending communication to or from remote interface processors.

Figure 3:
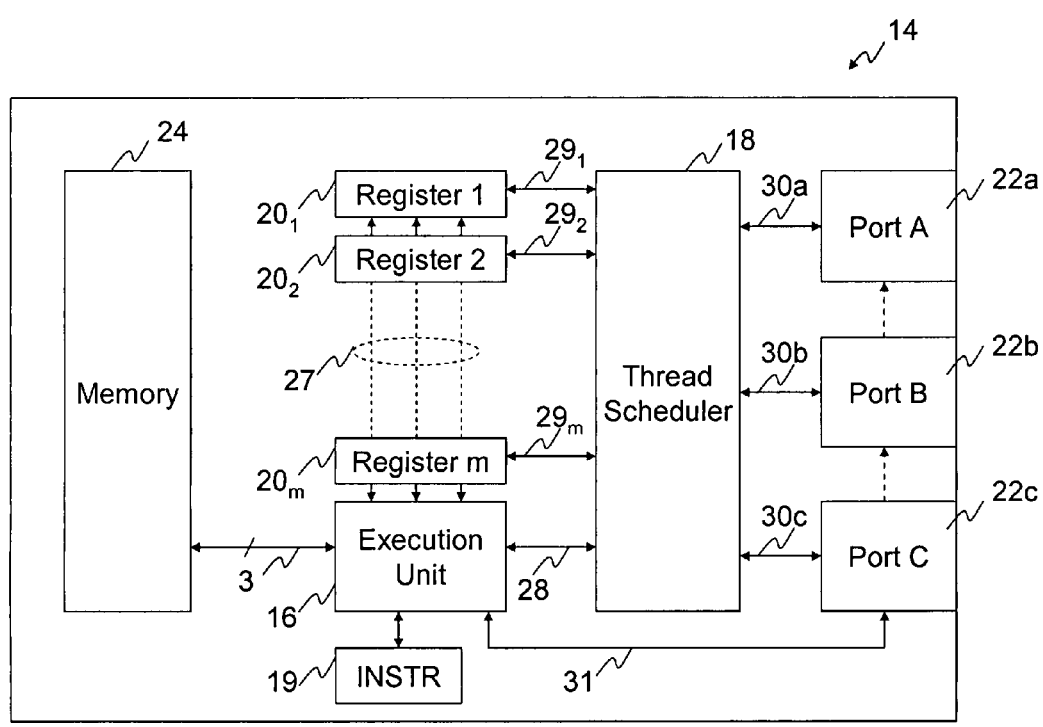
FIG. 3 is a schematic representation of the architecture of an interface processor.

FIG. 3 shows schematically an exemplary architecture of an interface processor 14 according to one embodiment of the present invention. The processor 14 comprises an execution unit 16 for executing threads of instructions under the control of a thread scheduler 18. The processor 14 further comprises a Random Access Memory (RAM) 24 for holding program code and other data, and a Read Only Memory (ROM) (not shown) for storing permanent information such as boot code.

The thread scheduler 18 dynamically selects which thread the execution unit 16 should execute. Conventionally, the function of a thread scheduler would simply be to schedule threads from the program memory in order to keep the processor fully occupied. However, according to the present invention, the scheduling by the thread scheduler 18 is also related to activity at the ports 22. It is noted in this respect that the thread scheduler may be directly coupled to the ports 22 so as to minimise the delay when a thread becomes runable as a result of an input or output activity at the port.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16. The details of these registers and buffers are discussed later.

Of the m threads, the thread scheduler 18 maintains a set of n runnable threads, the set being termed "run", from which it takes instructions in turn, preferably in a round-robin manner. When a thread is unable to continue it is suspended by removing it from the run set. The reason for this may be, for example, because the thread is awaiting one or more of the following types of activity:

its registers are being initialised prior to it being able to run,
it has attempted an input from a port which is not ready or has no data available,
it has attempted an output to port which is not ready or has no room for the data,
it has executed an instruction causing it to wait for one or more events which may be generated when ports become ready for input.

Note that the term "event" as used herein refers to a particular type of operation, which is slightly different from basic input-output operation. The distinction is discussed below in relation to FIGS. 4 and 5.

Advantageously, in order to facilitate rapid reaction time, a direct hardwired connection 28 is provided between the thread scheduler 18 and the execution unit 16 to allow the thread scheduler 18 to control which thread or threads the execution unit 16 should fetch and execute. Direct hardwired paths 30a, 30b, 30c are also provided between the thread scheduler 18 and each of the ports 22; and direct hardwired paths $29_1 \ldots 29_m$ are provided between the thread scheduler 18 and each of the registers 20. These direct paths preferably provide control paths which allow the thread scheduler to associate a respective thread with one or more of the ports 22, and particularly to return ready indications from the ports when certain activity occurs, allowing the processor to respond quickly to activity or stimuli occurring at the ports 22. The operation of the thread scheduler in relation to the ports is discussed below with regard to FIGS. 4 and 6.

The execution unit 16 also has access to each of the ports 22a-22c and each of the registers $20_1$-$20_m$ via direct connections 27 and 31, thus providing a direct link between the core processor, registers, and the external environment. Preferably, these direct paths provide further control paths allowing the execution unit to pass conditions to the ports. This is discussed in further detail below with regard to FIG. 4. The direct paths 27 and 31 may also allow data to be input and output directly between the thread registers 20 and the ports 22, thus allowing threads to communicate directly with the external environment. For example, data may be written directly from an external device to one of a thread's operand registers, rather than being written to memory 24 and then subsequently fetched. Conversely, following an operation, data from an operand register may be picked up by the execution unit 16 and sent directly out of a port 22. This improves reaction time significantly.

Note that by "direct connection" or "direct path" it is meant a connection separate from the connection between the execution unit and the program memory 24. Thus, for example, the thread scheduler 18 and execution unit 16 have access to data input from ports 22 without that data being stored and then subsequently fetched from memory 24. Particularly, if the connection between the execution unit 16 and memory 24 is via a bus 13, then a "direct" connection or path means one which is separate from the bus. Thus the various communications between ports 22, registers 20, thread scheduler 18 and execution unit 16 can all occur without the need for bus arbitration, improving reaction time. The ports 22 may also be provided with an additional connection (not shown) with the bus 13.

The term "port" as used in this application can refer to either a "pin port" or a "data port". A pin port is responsible for detecting individual logical transitions, i.e. rising and falling edges, of a signal occurring at a pin at the processor chip's physical boundary. Data ports are "higher level" in that they can handle one or more bits, typically accumulated in an I/O buffer, and typically making up a portion of data such as a word. Instead of detecting rising and falling edges, a data port handles the state or logic level of a bit or bits at a particular instant. A data port may be on/off chip, or it may be a port to another processor embedded on the same chip. Note that "pin port" and "data port" may in fact refer to different modes of the same actual port.

Figure 4:
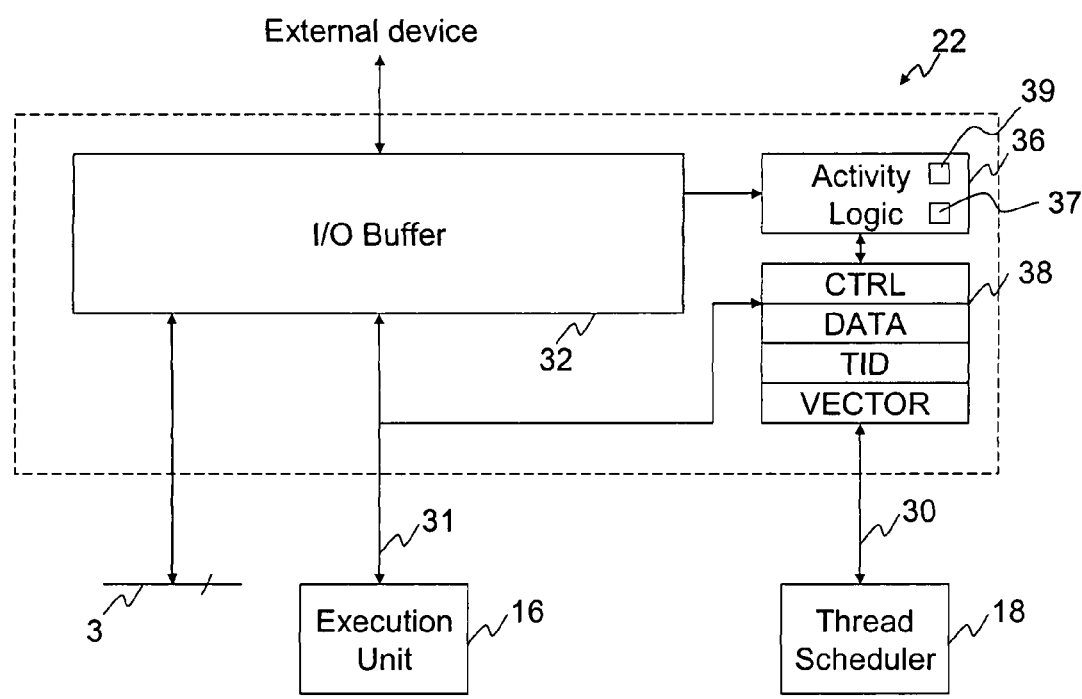
FIG. 4 is a schematic representation of a port.

FIG. 4 shows schematically a port 22 according to a preferred embodiment of the invention. The port 22 comprises an I/O buffer 32 for passing input and output data to and from the processor 14. In addition, each port 22 comprises activity handling logic 36 for monitoring activity occurring at the port and signalling the occurrence of certain activity by means of at least one ready bit or flag 37. The ready flag 37 is preferably signalled to the thread scheduler via direct path 30. Potential activity which the port may detect includes:

data has been input to the port,
some specific data has been input to the port, and/or
the port has become available for output.

To facilitate the detection of such activity, the port 22 is provided with a set of registers 38. These comprises a thread identifier (TID) register for storing an identification of the relevant thread, a control (CTRL) register for storing one or more conditions, a continuation point vector (VECTOR) register for storing the position in the program where execution was suspended, and a data (DATA) register for storing any data associated with a condition. The values TID is written to the registers 38 by the thread scheduler 18 via the direct path 30 (which would be 30a, 30b, 30c in FIG. 3), and the values VECTOR, CTRL and DATA are written by the execution unit 16 via the direct path 31. The TID is returned to the thread scheduler 18 upon detection of the desired activity in order to identify the associated thread. The activity logic also comprises an enable flag 39, which is discussed in further detail below.

Note that although the registers 38 are shown in FIG. 4 as being contained within the port 22, they may in fact be situated elsewhere within the processor 14 and simply associated with the port 22.

Figure 5:
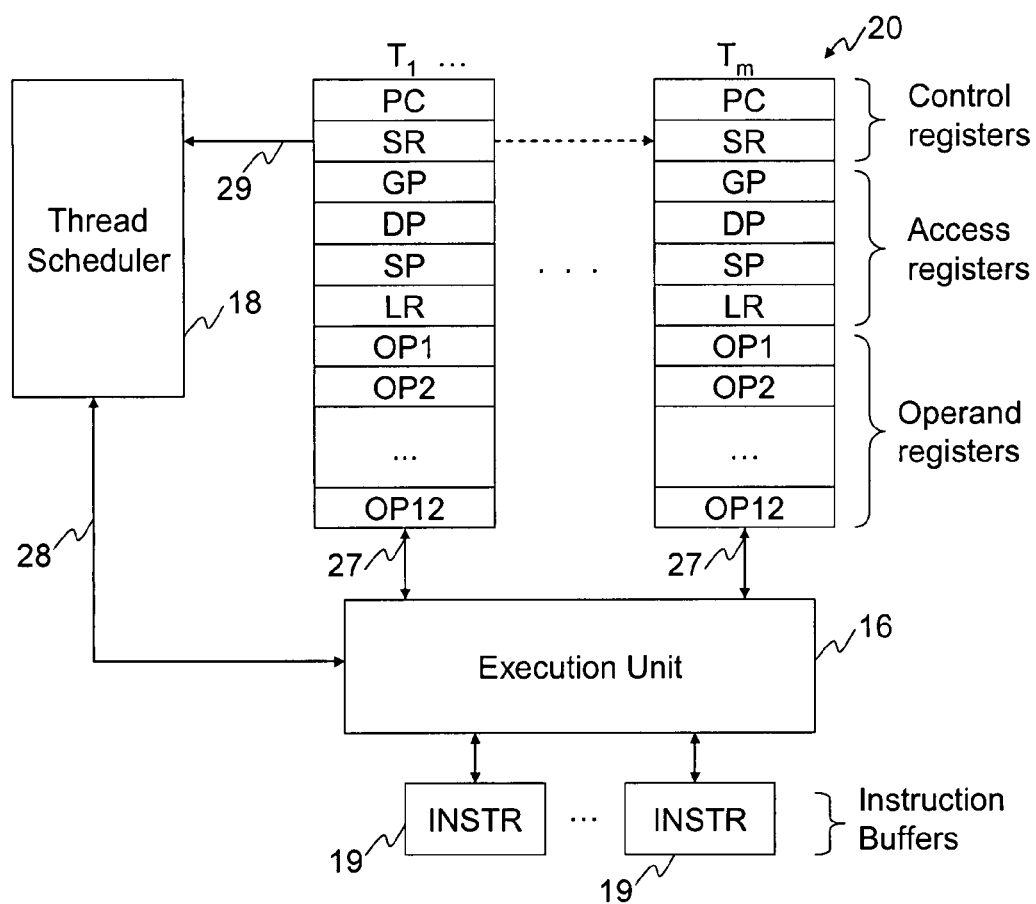
FIG. 5 is a schematic representation of thread register sets.

FIG. 5 shows an exemplary bank of thread registers 20 used to represent the threads. The bank 20 comprises a plurality of sets of registers corresponding to respective threads $T_1$ to $T_m$ which are currently under consideration by the thread scheduler 18. In this preferred example, the state of each thread is represented by eighteen registers: two control registers, four access and twelve operand registers. These are as follows.

Control Registers:
  PC is the program counter
  SR is the status register
Access Registers:
  GP is the global pool pointer
  DP is the data pointer
  SP is the stack pointer
  LR is the link register
Operand Registers: OP1 . . . OP12

The control registers store information on the status of the thread and for use in controlling execution of the thread. Particularly, the ability of a thread to accept events or interrupts is controlled by information held in the thread status register SR. The access registers include a stack pointer used for local variables of procedures, a data pointer normally used for data shared between procedures and a constant pool pointer used to access large constants and procedure entry points. The operand registers OP1 . . . OP12 are used by instructions which perform arithmetic and logical operations, access data structures, and call subroutines.

A number of instruction buffers (INSTR) 19 are also provided for temporarily storing the actual instructions of the thread. Each instruction buffer is preferably sixty-four bits long, with each instruction preferably being sixteen bits long, allowing for four instructions per buffer. Instructions are fetched from program memory 24 under control of the thread scheduler 18 and placed temporarily in the instruction buffers 19.

The execution unit has access to each of the registers 20 and buffers 19. Further, the thread scheduler 18 has access to at least the status register SR for each thread.

As mentioned above, the term "event" as used herein refers to a particular type of operation, or to the activity corresponding to that particular type of operation. Event based operations are slightly different from basic input-output operations, and work as follows. An event is first set for a thread by transferring a continuation point vector from the execution unit 16 and a thread identifier from the thread scheduler 18 to the VECTOR and TID registers 38 associated with a port 22, preferably via direct paths 31 and 30. An associated condition and condition data may also be written to the CTRL and DATA registers 38 of the port 22. The event is thus set at the port, but not necessarily enabled. To enable the port to generate an indication of an event, the port's enable flag 39 must also be asserted, preferably by the thread scheduler 18 via direct path 30. Further, to enable the thread itself to accept events, the thread's event enable (EE) flag in the respective status register SR for the thread must be set to event-enabled. Once the event is thus set and enabled, the thread can be suspended awaiting the event using an event-based wait instruction which acts on the thread scheduler 18. At this point, the current pending instruction may be discarded from the relevant instruction buffer 19. When the event occurs, e.g. some data is input to the port, the occurrence is signalled by the return of the thread identifier and continuation point vector from the port 22 to the thread scheduler 18 and execution unit 16, allowing the instruction at the continuation point vector to be fetched from program memory 24 into an instruction buffer 19 and execution resumed at the appropriate point in the code.

When the event occurs, the thread's EE flag in the respective status register SR may be set to event-disabled to prevent the thread from reacting to events immediately after the occurs. The enable flag 39 may be de-asserted as a result of the thread executing instructions when the event occurs.

The enable flag 39 can be asserted whilst setting up a number of ports in preparation for waiting for an event from one or more of the ports. The thread's EE flag may also be set to event-enabled prior to enabling a set of port enable flags and in this case the first port to be enabled which is ready will generate and event causing the current instruction to be discarded and execution to proceed by immediately fetching and executing the instruction at the continuation point vector.

The advantage of the port's enabling flag 39 and status register EE flag is that the enabling and disabling of events is separated from both the setting up of the events and the suspension of a thread by a wait instruction, allowing different input and output conditions to be readily toggled on and off for a particular thread and/or for various different threads. For example, an event may be left set up at a port 22 even though the event is disabled. Thus events may be re-used by a thread because, although the event has already occurred once, the thread identifier, continuation point vector and condition are still stored in the TID, VECTOR, CTRL and DATA registers 38 of the port 22. So if the thread needs to re-use the event, the port's registers 38 do not need to be re-written, but instead the port's enable flag 39 can simply be re-asserted and/or the EE flag in the status register SR for a thread can be re-set to event-enabled. A further wait instruction will then suspend the thread pending a re-occurrence of the same event.

Furthermore, the use of continuation point vectors allows multiple events to be enabled per thread. That is, a given thread can set up one event at one port 22a by transferring a continuation point vector to that port, set up another event at another port 22b by transferring a different continuation point vector to that other port, and so forth. The thread can also enable and disable the various events individually by separately asserting or de-asserting the different enable flags 39 for each respective port. A wait instruction will then cause the thread to be suspended awaiting any enabled event.

In contrast with events, using basic I/O operations the thread scheduler 18 does not transmit a continuation point vector to the VECTOR register, and does not use the port's enable flag 39 or the EE flag in the status register SR. Instead, the pending instruction is simply left in an instruction buffer 19, and if necessary execution is simply paused pending either an input or the availability of the port for output, as indicated by the ready flag 37. In embodiments, only the TID register may be required for scheduling according to a basic I/O. A basic I/O may or may not use a condition in the CTRL and DATA registers. If such a condition is not used, the I/O will simply be completed as soon as the port is ready.

Note also that once execution of a thread is resumed following an event, it may of course subsequently perform a basic I/O operation. Conversely, once a thread is resumed following a basic I/O, it may subsequently include an event operation. Any such chain of events and I/Os may be included in a thread. For example, a basic I/O operation may be interleaved between two event-based wait operations while the event is disabled (i.e. while the port's enable flag 39 and/or the status register's EE flag is de-asserted) but while the event vector and condition are still left set in the registers 38. That is, the event may be disabled following completion of a first event-based wait operation, a basic I/O subsequently performed using the same port, and then the same event re-enabled for use in a second event-based wait operation. As discussed above, the basic I/O operation pauses and un-pauses the thread but does not effect the port's enable flag 39 or the EE flag in the status register, nor transfer control to the event vector.

Figure 6:
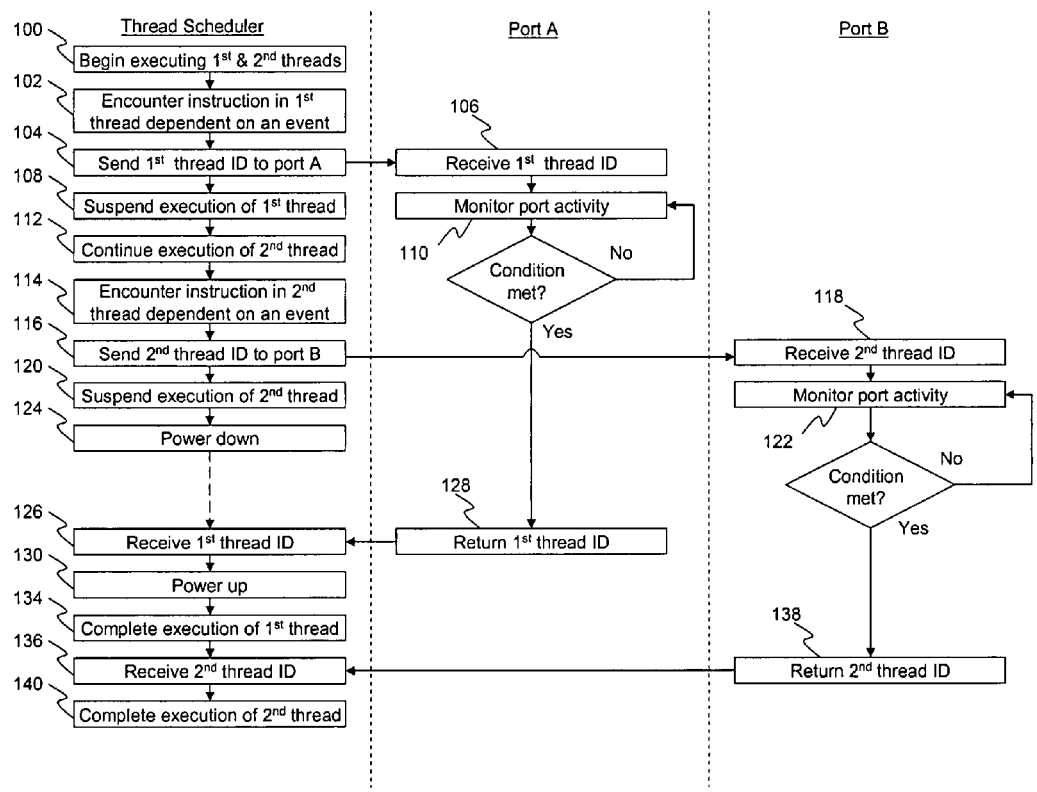
FIG. 6 is a flow diagram illustrating the operation of the thread scheduler.

The operation of the thread scheduler and two exemplary ports is now described with reference to the flow diagram of FIG. 6. In step 100 the execution unit 16 begins execution of a first and a second thread under the direction of the thread scheduler 18. At step 102 the thread scheduler encounters a portion of code within the first thread which is conditional on an event, for example the receipt of some particular signal at the port 22a. At step 104, the thread scheduler sends the thread identifier (TID) of the first thread to the Port 22a, along with a continuation point vector (VECTOR) specifying at what point in the program thread execution should be continued once the event is detected, and also any required condition control information (CTRL) and associated data (DATA). For example, the data may be the value of the signal which the instruction is expecting to receive at the port. At step 104, the thread scheduler may also set the enable flag 39 of the first port and set the status register SR of the first thread to event-enabled.

At step 106 the port 22a receives this information from the thread scheduler 18. At step 108 the thread scheduler 18 suspends execution of the first thread. At step 110 the port 22a begins to monitor the activity at that port.

At step 112 the thread scheduler 18 determines that the second thread is still outstanding and the execution unit 16 continues execution of the second thread under the direction of the thread scheduler 18. In step 114 the thread scheduler 18 encounters a portion of code which is conditional on an event. At step 116 the thread scheduler 18 sends the thread identifier, along with the continuation point vector and any other required condition information, to the port 22b. At step 116, the thread scheduler may also set the enable flag 39 of the second port and set the second status register for the second thread to event-enabled. At step 118 the port 22b receives this information. At step 120 the thread scheduler suspends execution of the second thread. At step 122 the port 22b begins to monitor the activity occurring at that port.

At step 124 the thread scheduler determines that there are currently no more outstanding threads to be scheduled and the system powers down all components except for the ports 22a and 22b. At step 128 the port 22a detects the relevant event, for example the receipt of the signal stored in the DATA register, and consequently returns the thread identifier (TID) and continuation point vector (VECTOR) (as well as setting the status register of the first thread to event-disabled). At step 126 the thread scheduler 18 receives the returned identifier. Now that execution can continue, at step 130 the system powers up again. At step 134 the execution unit 16 completes the execution of the first thread under the direction of the thread scheduler 18. At step 138 the port 22b detects the relevant event for the second thread and returns its thread identifier and continuation point vector (as well as setting the status register of the second thread to event-disabled). At step 136 the thread scheduler 18 receives the returned information, and at step 138 the execution unit 16 completes the execution of the second thread under the control of the thread scheduler 18. Note that there could be an additional powering down step between steps 134 and 136.

Figure 7:
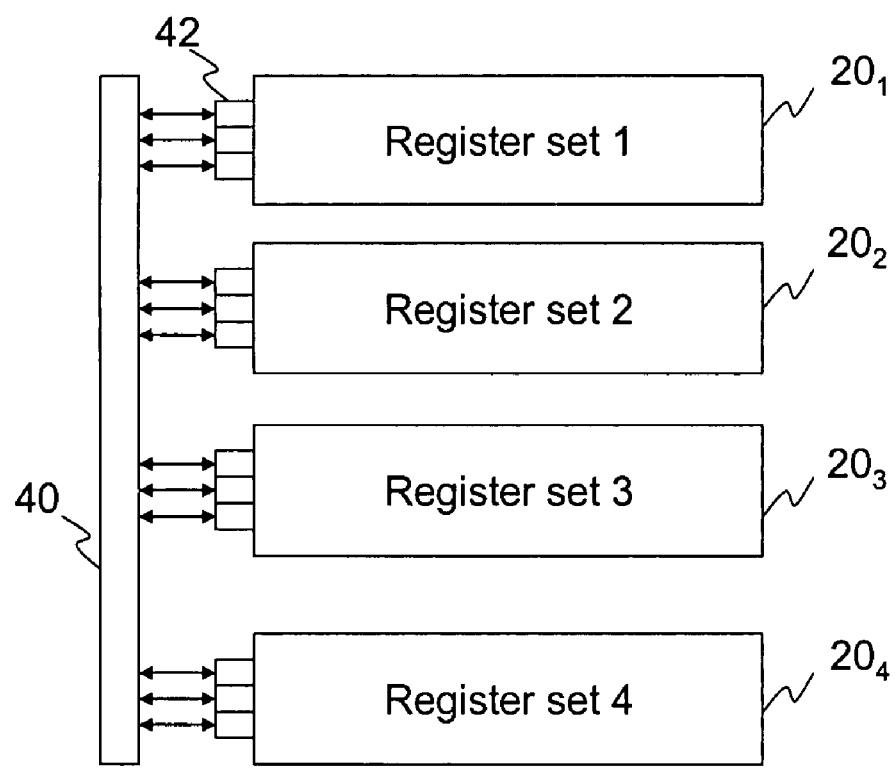
FIG. 7 is a schematic representation of channels between thread register sets.

As illustrated in FIG. 7, the principle of the invention can also be extended to communication between threads, or more accurately between the thread register sets 20 which store information representing the threads. For illustrative purposes, only four thread register sets $20_1$ to $20_4$ are shown in FIG. 7, each storing information for a respective thread $T_1$ to $T_4$. Each of the thread register sets is connected to each of the other sets by an interconnect system 40, which is operable to establish at least one channel for transferring data directly between at least two of the thread register sets 20. Channels are preferably used to transfer data to and from the operand registers OP, but could in principle be used to transfer information to or from other types of register such as a status register SR. The thread scheduler 18 can schedule threads based on activity occurring over channels in a similar manner as discussed in relation to ports above.

Figure 7A:
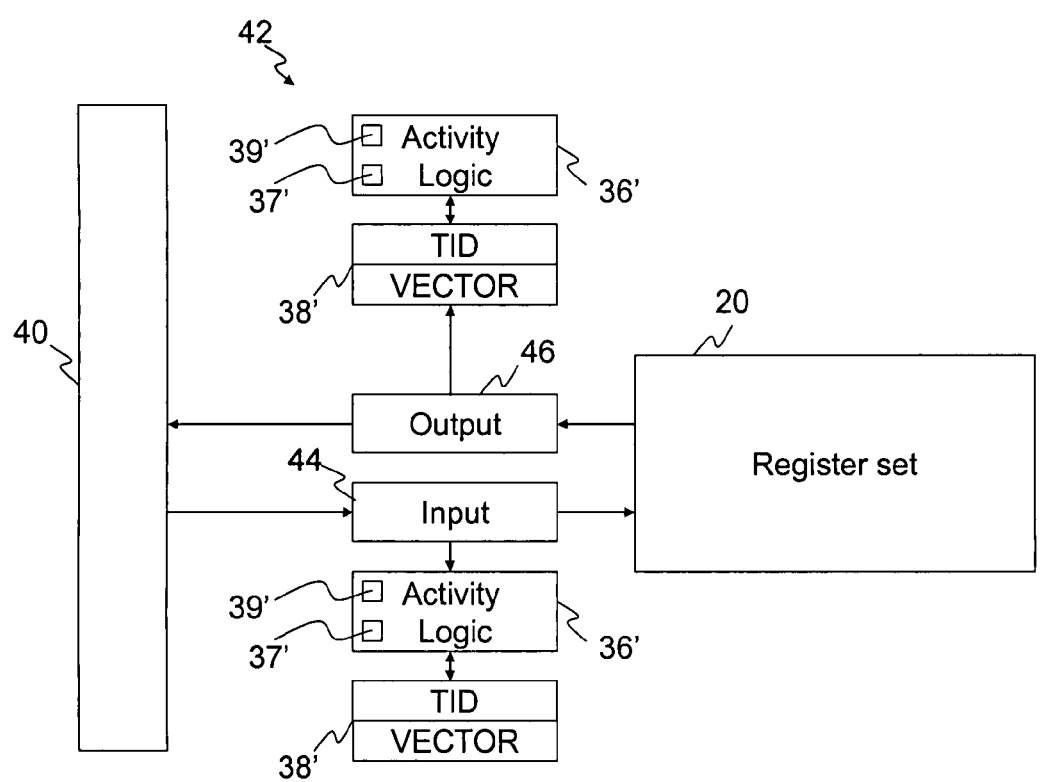
FIG. 7A is a schematic representation of a channel end.

As shown in FIG. 7A, each of the channel ends 42 resembles a pair of ports, with an input buffer 44 and an output buffer 46. Similarly to the ports 22, each channel input buffer 44 and output buffer 46 may have activity handling logic 36' for monitoring activity occurring over a channel and signalling the occurrence of certain activity by means of at least one ready flag 37'. Potential activity which the channel end may detect includes: that data has been input to the channel, or that the channel has become available for output. If an output instruction is executed when the channel is too full to take the data then the thread which executed the instruction is paused, and is restarted when there is enough room in the channel for the instruction to successfully complete. Likewise, when an instruction is executed and there is not enough data available then the thread is paused, and will be restarted when enough data becomes available.

Again as with the ports 22, in order to facilitate the detection of such activity, each channel end is associated with registers 38'. These comprise a thread identifier (TID) register for storing an identification of the relevant thread, and a continuation point vector (VECTOR) register for storing the position in the program where execution should resume upon occurrence of an event. These TID and VECTOR registers can then be used by the thread scheduler 18 and execution unit 16 to schedule threads in the same manner as with the ports 22. The VECTOR register allows the channel to generate events and interrupts. The channel end also has an enable flag 39' to enable the channel to generate events. In embodiments, the channel ends 42 may not be provided with CTRL and DATA registers.

The same channel ends 42 may also be used to communicate data from the thread registers to the external environment via the ports 22. That is, the execution unit 16 may pick up the contents of a register 20 via a channel end 42 and pass it directly out via a port 22; and conversely, the execution unit 16 may also receive input from a port 22 and transfer it directly to a register 20 via a channel end 42. Thus if two or more interface processors according to the present invention are connected together, as shown for example in FIG. 2A, a channel can also be established between those processors. Within an inter-processor system, each processor may interface with a system interconnect via a number of bidirectional physical links 204 which allow simultaneous connection with other processors.

The general term used herein to cover ports, channels, and other sources of activity is "resource".

The interface processor can support several programming approaches due to its thread-based structure. It can be treated as a single conventional processor performing standard input and output, or it can be programmed as part of a parallel array of hundreds of communicating components. An instruction set is provided which supports these options. The instruction set includes special instructions which support initialisation, termination, starting and stopping threads and provide input/output communication. The input and output instructions allow very fast communications with external devices. They support high-speed, low-latency input and output and high-level concurrent programming techniques. Their application therein to handling port activity is discussed more fully in the following, which describes example instructions that can be used to implement the present invention.

Resources are firstly reserved for a thread using a GETR instruction specifying the type of resource required, and can be freed again using a FREER instruction.

Ports can be used in input or output mode. In input mode a condition can be used to filter the data passed to the thread. A port can be used to generate events or interrupts when data becomes available as described below. This allows a thread to monitor several ports, only servicing those that are ready. Input and output instructions, IN and OUT, can then be used to transfer of data to and from ports once ready. In this case, the IN instruction inputs and zero-extends the n least significant bits from an n-bit port and the OUT instructions outputs the n least significant bits.

Two further instructions, INSHR and OUTSHR, optimise the transfer of data. The INSHR instruction shifts the contents of a register right by n bits, filling the left-most n bits with the data input from the n-bit port. The OUTSHR instruction outputs the n least significant bits of data to the n-bit port and shifts the contents of a register right by n bits.

| OUTSHR port, s | port ◁ s[bits 0 for width(port)]; | output from |
| --- | --- | --- |
| | s ← s >> width(port) | port and shift |
| INSHR port, s | s ← s >> width(d ); | shift and input |
| | port ▷ s[bits (bitsperword − width(d)) for width (d)] | from port |
| where the "▷" represents an input and the "◁" represents an output. | | |

A port must be configured before it can be used. It is configured using the SETC instruction which is used to define several independent settings of the port. Each of these has a default mode and need only be configured if a different mode is needed.

SETC port, mode port[ctrl]←mode set port control

The effect of the SETC mode settings is described below. The first entry in each setting is the default mode.

| Mode | Effect |
| --- | --- |
| OFF | port not active; pin(s) high impedance |
| ON | active |
| IN | port is an input |
| OUT | port is an output (but inputs return the current pin value) |
| EVENT | port will cause events |
| INTERRUPT | port will raise interrupts |
| DRIVE | pins are driven both high and low |
| PULLDOWN | pins pull down for 0 bits, are high impedance otherwise |
| PULLUP | pins pull up for 1 bits, but are high impedance otherwise |
| UNCOND | port always ready; inputs complete immediately |
| EQUAL | port ready when its value is equal to its DATA value |
| NE | port ready when its value is different from its DATA value |
| TRANSITION | port ready when its value changes towards its DATA value |

-continued

| Mode | Effect |
| --- | --- |
| GR | port ready when its value is greater than its DATA value |
| LS | port ready when its value is less than its DATA value |

The DRIVE, PULLDOWN and PULLUP modes are only relevant when the port direction is OUT. The TRANSITION condition is only relevant for 1-bit ports and the GR and LS conditions are only relevant for ports with more than one bit.

Each port has a ready bit 37 which is used to control the flow of data through the port, and defines whether the port is able to complete input or output instructions. The ready bit is set in different ways depending on the port configuration. The ready bit is cleared when any of the SETC, SETD or SETV instructions are executed.

A port in input mode can be configured to perform conditional input. The condition filters the input data so that only data which meets the condition is returned to the program. When a condition is set, the IN and INSHR instructions will only complete when the port is ready. As described above, executing an input instruction on a port which is not ready will pause the thread. When ready, the port sets its ready bit which is signalled to the thread scheduler. The thread resumes and re-executes the input instruction. This time the port is ready, the data is returned and the ready bit 37 is cleared.

Once a port ready bit is set, the data value which satisfied the condition is captured so that the software gets the value which met the condition even if the value on the port has subsequently changed. When an IN or INSHR instruction is executed and the ready bit is set then the data is returned and the ready bit cleared. If the ready bit is not set then the thread is paused until the ready bit is set. If a condition is set then the data is compared against the condition and the ready bit is only set when the condition is met.

When the OUT or OUTSHR instruction is executed if the ready bit is clear then the data is taken by the port and the ready bit is set. If the ready bit is set then the thread is paused until it is cleared by the port.

In order to communicate between two threads, two channel ends need to be allocated, one for each thread. This is done using a GETR CHAN instruction. The two threads can then use the resource identifiers to transfer a data word using output and input instructions:

| OUT | d ◁ s |
| --- | --- |
| IN | d ▷ s |

If an output instruction is executed when the channel is too full to take the data then the thread which executed the instruction is paused. It is restarted when there is enough room in the channel for the instruction to successfully complete. Likewise, when an input instruction is executed and there is enough data available then the thread is paused and will be restarted when enough data becomes available. When it is no longer required, the channel can be freed using a FREER CHAN instruction. Otherwise it can be used for another message.

Events and interrupts allow resources (ports and channels) to automatically transfer control to a predefined event handler. The ability of a thread to accept events or interrupts is controlled by information held in the thread status register SR (see FIG. 4), and may be explicitly controlled using TSE and TSD instructions. This information comprises an event enable flag (EE) and an interrupt enable flag (IE).

| TSE s | SR ← SR V s | thread state enable |
|---|---|---|
| TSD s | SR ← SR ∧ ¬ s | thread state disable |

The operand of these instructions should be one of:

| EE | to enable or disable events |
|---|---|
| IE | to enable or disable interrupts |

Events are handled in the same scope in which they were set up. Hence, on an event all the thread's state is valid, allowing the thread to respond rapidly to the event. The thread can perform input and output operations using the port which gave rise to an event whilst leaving some or all of the event information unchanged. This allows the thread to complete handling an event and immediately wait for another similar event.

The program location of the event handler must be set prior to enabling the event using the SETV instruction. Ports have conditions which determine when they will generate an event; these are set using the SETC and SETD instructions. Channels are considered ready as soon as they contain enough data or have room to accept data for output.

Event generation by a specific port or channel can be enabled using an event enable unconditional (EEU) instruction and disabled using an event disable unconditional (EDU) instruction. The event enable true (EET) instruction enables the event if its condition operand is true and disables it otherwise; conversely the event enable false (EEF) instruction enables the event if its condition operand is false, and disabled it otherwise. These instructions are used to optimise the implementation of guarded inputs. Below are some example instruction formats for configuring events on ports, but it will be understood that the same instructions can apply in relation to channels.

| SETV port, v | port[vector] ← v | set event vector |
|---|---|---|
| SETD port, d | port[data] ← d | set event data |
| SETC port, c | port[ctrl] ← c | set event control |
| EET port, b | port[enable]← b; port[ tid ] ← thread | event enable true |
| EEF port, b | port[enable]← ¬ b; port[tid] ← thread | event enable false |
| EDU port | port[enable]← false; port[ tid ] ← thread | event disable |
| EEU port | port[enable]← true; port[ tid ] ← thread | event enable |

Having enabled events on one or more resources, a thread can use a WAITEU instruction to wait for at least one event. This may result in an event taking place immediately with control being transferred to the event handler specified by the corresponding event vector with events disabled by clearing the EE (event enable) flag. Alternatively the thread may be suspended until an event takes place—in this case the EE flag will be cleared when the event takes place, and the thread resumes execution.

| WAITET b | if b then SR[EE] ← true | event wait if true |
|---|---|---|
| WAITEF b | if ¬ b then SR[EE] ← true | event wait if false |
| WAITEU | SR[EE] ← true | event wait |
| CLRE | SR[EE] ← false; forall port if port[tid] = thread then port[enable] ← false | disable all events for thread |

To optimise the common case of repeatedly waiting for one or more events until a condition occurs, conditional forms of the event wait instruction are provided. The WAITET instruction waits only if its condition operand is true, and the WAITEF waits only if its condition operand is false.

All of the events which have been enabled by a thread can be disabled using a single CLRE instruction. This disables event generation in all of the ports which have had events enabled by the thread. The CLRE instruction also clears the event-enabled status in the thread's status register.

In order to optimise the responsiveness of a thread to high priority resources, the TSE EE instruction can be used to enable events on a thread first before subsequently starting to enable the ports and/or channels and using one of the event wait instructions. This way, the processor can scan through the resources in priority order. This may cause an event to be handled immediately as soon as it is enabled.

In contrast to events, interrupts are not handled within the current scope and so the current PC and SR (and potentially also some or all of the other registers) must be saved prior to execution of the interrupt handler. On an interrupt generated by resource r the following occurs automatically:
SAVEPC←PC;
SAVESR←SR;
SR[EE]←false;
SR[IE]←false;
PC←r[vector]

When the handler has completed, execution of the interrupted thread can be performed by an RFINT instruction.

| RFINT | PC ← SAVEPC; SR ←SAVESR | return from interrupt |
|---|---|---|

An interrupt could interrupt a thread whilst suspended awaiting an event.

The following examples show how the instructions are used by threads to perform input, output and logical operations. In the examples, the following instructions are used:

| LDFI: | loads an instruction address into a register |
|---|---|
| LDI: | loads a constant value into a register |
| EQI: | produces a Boolean (truth) value if a register value equals a constant |
| OR: | produces the logical OR of two register values |
| ADD: | adds two register values |
| ADDI: | adds a constant to a register value |
| SHL: | shifts the contents of a register left |
| BBF: | branches to another point in the program if a Boolean value is false |
| OUT: | outputs data |

The following shows example code for inputting an 8-bit byte serially from a pin. Each bit of data is input from a first port when a signal received at a second port from an external clock changes from 0 to 1 to indicate that the data should be taken. In a high level language, the operation looks like this:

```
PROC inbyte(clock, data)
VAR byte;
{ FOR n = 0 FOR 8
    WHEN clock ? TO 1 DO { data ? bit ; byte = (byte << 1) + b };
  RETURN byte
}
```

The instruction level program for this is shown below.

|      | SETC   | clock, TRANSITION   |
|      | SETD   | clock, 1            |
|      | LDI    | byte, 0             |
|      | LDI    | count, 0            |
| loop: |       |                     |
|      | IN     | clock, c            |
|      | IN     | data, bit           |
|      | SHL    | byte, byte, data    |
|      | ADD    | byte, byte, bit     |
|      | ADDI   | count, count, 1     |
|      | EQI    | go, count, 8        |
|      | BBF    | go, Loop            |

It would be possible to execute two or more such code sequences at the same time by allocating each one of them to its own thread.

The following shows example code, using some of the above instructions, for implementing a NAND type process which wakes up whenever one of two inputs x and y changes state. The high level code is:

```
PROC nand(x, y, z) IS
WHILE TRUE
{ WHEN x ? TO notx DO { notx := NOT notx; z ! (notx OR noty) }
| WHEN y ? TO noty DO { noty := NOT noty; z ! (notx OR noty) }
}
```

In low level code, the process comprises a single thread which initialises two ports x and y with vectors "xv" and "yv" respectively, and enables these ports to generate events. The corresponding instruction level program is as follows:

| nand: |       |                     |
|      | LDI    | notx, 1             |
|      | LDI    | noty, 1             |
|      | SETC   | x, TRANSITION       |
|      | SETD   | x, notx             |
|      | SETC   | y, TRANSITION       |
|      | SETD   | y, noty             |
|      | LDFI   | temp, xv            |
|      | SETV   | temp, x             |
|      | LDFI   | temp, yv            |
|      | SETV   | temp, y             |
|      | EEU    | x                   |
|      | EEU    | y                   |
|      | WAIT   |                     |
| xv:  |        |                     |
|      | EQI    | notx, notx, 0       |
|      | SETD   | x, notx             |
|      | OR     | temp, notx, noty    |
|      | OUT    | z, temp             |
|      | WAIT   |                     |
| yv:  |        |                     |
|      | EQI    | noty, noty, 0       |
|      | SETD   | y, noty             |
|      | OR     | temp, notx, noty    |
|      | OUT    | z, temp             |
|      | WAIT   |                     |

In operation, either the x-input changes or the y-input changes and control transfers either to xv or to yv. In either case, the response code executes five instructions, then waits for the next input state-change. Latency from input change to output change may be less than about 10 cycles. A 1 GHz processor can emulate 100 MHz logic.

As another example, the following shows a process for implementing D-type flip-flop logic which wakes up whenever an input changes state but only changes output when clocked by an external clock. The high-level program is:

```
PROC dtype(d, ck, q) IS
WHILE TRUE
{ WHEN d ? TO notd DO notd := NOT notd
| WHEN ck ? TO TRUE DO q ! NOT notd
}
```

The corresponding instruction level program is:

| dtype: |       |                 |
|       | IN     | d, temp         |
|       | EQI    | temp, temp, 0   |
|       | SETC   | d, TRANSITION   |
|       | SETD   | d, temp         |
|       | SETC   | ck TRANSITION   |
|       | LDI    | temp, 1         |
|       | SETD   | ck, temp        |
|       | LDFI   | temp, dv        |
|       | SETV   | d, temp         |
|       | LDFI   | temp, ckv       |
|       | SETV   | ck, ckv         |
|       | EEU    | d               |
|       | EEU    | ck              |
|       | WAIT   |                 |
| dv:   |        |                 |
|       | IN     | d, temp         |
|       | SETD   | d, temp         |
|       | WAIT   |                 |
| ckv:  |        |                 |
|       | EQI    | temp, notd, 0   |
|       | OUT    | q, temp         |
|       | WAIT   |                 |

In operation, either the d-input changes or the ck-input changes. In either case, the response code executes three instructions, then waits for the next input state-change. Latency from input change to output change may be less than about 10 cycles. Again, a 1 GHz processor can emulate 100 MHz logic.

The following gives an example of some more complex logic. Like the D-type, it tracks the input data (which may be several bits wide) so that this is set up when the external clock arrives (another way would be to only read the data on the clock, in which case there would be a non-zero hold time for the data). The output is calculated—in the example below by a lookup table—and output on the clock. A more complex function of the input could be calculated and this would potentially add more instructions at the point indicated below. However, notice that a processor can calculate some very complex functions (relative to a small LUT) in only a few instructions. The high-level code is:

```
PROC lookup(d, ck, q) IS
WHILE TRUE
{ WHEN d ? x : x != lastx DO lastx := x
| WHEN ck ? TO TRUE DO q ! lookup[lastx]
}
```

The corresponding instruction level program is:

```
logic:
    IN      d, data
    SETC    d, NE
    SETD    d, data
    SETC    ck, TRANSITION
    LDI     temp, 1
    SETD    ck, temp
    LDFI    temp, dv
    SETV    d, temp
    LDFI    temp, ckv
    SETV    ck, temp
    EEU     d
    EEU     ck
    WAIT
dv:
    IN      d, data
    SETD    d, data
    WAIT
ckv:
    LDW     temp, lookup, data // replace this to change function
    OUT     temp, q
    WAIT
```

In operation, either the d-input changes or the ck-input changes. In either case, the response code executes three instructions, then waits for the next input state-change. Latency from input change to output change may be less than about 10 cycles. Again, a 1 GHz processor can emulate 100 MHz logic.

Note also that the above examples demonstrate how a given thread can handle multiple activities, such as multiple events.

In contrast to events, interrupts require state to be saved on entry to an interrupt handler and restored on exit in order to make registers available for use within the handler. In addition, the handler will normally-need to retrieve state from when it was last entered and save it ready for when it is next entered. A simple example of an interrupt handler is shown below. This uses some additional instructions:

```
LDWSP   loads a value from memory using the stack pointer
STWSP   stores a value to memory using the stack pointer
LDWDP   loads a value from memory using the data pointer
STWDP   stores a value to memory using the data pointer
EXTSP   used to extend the stack to make space for new values
LDAWSP  used to discard values from the stack
```

This example inputs a byte of data one bit at a time; in contrast to the above example using events it uses an interrupt handler. The high level program is:

```
PORT clock: INT, TRANSITION, 1;
VAR byte;
VAR count;
byte := 0;
count := 0;
ENABLE clock;
// program to be interrupted follows here
HANDLER inbyte( )
{ data ? bit ; byte := (byte << 1) + bit;
    count := count + 1;
    IF count = 8 THEN DISABLE clock
}
```

When the port is enabled to generate interrupts, the interrupt handler is entered every time an external clock makes a transition to logic 1. The handler takes data bits and forms a byte. The byte, together with a count of bits input are stored in locations in memory and accessed via the data pointer. When 8 bits have been input, the handler disables further interrupts leaving the byte ready for a program to use. The corresponding instruction level program is:

```
    SETD    clock, 1
    SETC    clock, TRANSITION
    SETC    clock, INT
    LDI     r0, 0
    STWDP   r0, byte
    STWDP   r0, n
    EEU     clock
    ... // program which will be interrupted
int: // interrupt handler
    EXTSP   2
    STWSP   R0, 0
    STWSP   R1, 1
    IN      clock, r0
    IN      data, r0
    LDWDP   r1, byte
    SHL     byte, byte, 1
    ADD     byte, byte, r0
    STWDP   r1, byte
    LDWDP   r0, n
    ADDI    r0, r0, 1
    STWDP   r0, n
    EQI     r0, r0, 8
    EEF     clock, r0
    LDWSP   R1, 1
    LDWSP   R0, 0
    LDAWSP  2
    RFINT
```

From the above description and examples, it can be seen how associating activity at respective ports with respective threads, and scheduling those threads based on events arising from that activity, advantageously provides a processor which can respond quickly to external stimuli.

It will be appreciated that the above embodiments are described only by way of example. In other embodiments, different sets of registers and instructions may be provided depending on the desired specifications of the chip. In some embodiments, thread identifiers need not be transmitted to ports but could remain the responsibility of the thread scheduler, or be stored elsewhere. Alternatively, each thread could be given an individual ready flag at the port, such that the thread identifier is passed to the port to select the correct ready signal but the thread identifier need not be returned to the thread scheduler upon detection of the activity. Further, conditions and/or condition data need not be transmitted to ports. Instead conditions could be preconfigured at ports and/or conditions could be evaluated at the thread scheduler or elsewhere. Threads may be scheduled based on activity from other sources other than ports and channels. Different interconnects may be provided between the various components of the processor. Also, the invention is not specific to use in a mobile terminal with a mobile applications processor. Other applications and configurations will be apparent to the person skilled in the art. The scope of the invention is not limited by the described embodiments, but only be the following claims.

The invention claimed is:

1. A processor comprising:
 a first port for inputting data to or outputting data from the processor and being operable to generate a first indication dependent on a first activity at the first port;
 a second port for inputting data to or outputting data from the processor and being operable to generate a second indication dependent on a second activity at the second port;
 an execution unit arranged to execute multiple threads, the multiple threads comprising a first thread and a second thread; and
 a thread scheduler connected to receive said first indication and said second indication, and arranged to schedule said multiple threads for execution by the execution unit based on the first indication and the second indication, by suspending execution of the first thread pending receipt of the first indication and suspending execution of the second thread pending receipt of the second indication;
 wherein the first activity is associated with the first thread and the second activity is associated with the second thread.

2. A processor according to claim 1, wherein the thread scheduler is arranged to transmit, to an identifier register associated with the first port, a first thread identifier relating to the first thread suspended pending the first activity.

3. A processor according to claim 2, wherein the thread scheduler is arranged to transmit, to an identifier register associated with the second port, a second thread identifier relating to the second thread suspended pending the second activity.

4. A processor according to claim 2, wherein the thread scheduler is arranged to transmit, upon suspending said first thread, a continuation point vector to a vector register associated with the first port; and the continuation point vector is returned to the execution unit in dependence on the first activity.

5. A processor according to claim 4, wherein: the first thread is associated with activity from a plurality of ports, respective activity being from a respective one of the plurality ports, and each of the plurality of ports being operable to generate a respective indication in dependence on the respective activity from the respective one of the plurality of ports; the execution unit is adapted to transmit, to each respective one of the plurality of ports, a respective one of a plurality of continuation point vectors, each respective one of the plurality of continuation point vectors being returned in dependence on the respective activity; and the thread scheduler is adapted to suspend the execution of the first thread until receipt of at least one of the respective indications.

6. A processor according to claim 5, wherein a port event enable flag is associated with the first port; and the thread scheduler is adapted to enable said first activity to trigger scheduling of the first thread by asserting the port event enable flag, and to disable the first activity from triggering scheduling of the first thread by de-asserting the port event enable flag.

7. A processor according to claim 6, wherein a thread event enable flag is associated with the first thread; and the thread scheduler is adapted to enable the first thread to be scheduled in dependence on the first activity by asserting the thread event enable flag, and to disable the first thread from being scheduled in dependence on the first activity by de-asserting the thread event enable flag.

8. A processor according to claim 7, wherein at least one of the port event enable flag and the thread event enable flag is de-asserted automatically by occurrence of the first activity.

9. A processor according to claim 7, wherein the thread scheduler is adapted to suspend execution of the first thread pending a third indication of a third activity from a port whilst at least one of the port event enable flag and the thread event enable flag is de-asserted.

10. A processor according to claim 7, wherein a plurality of respective port event enable flags are associated with each of the plurality of ports associated with the first thread; and the thread scheduler is arranged to assert the thread event enable flag and to subsequently assert said plurality of port event enable flags.

11. A processor according to claim 1, wherein the processor is adapted to power down at least one of the execution unit, the thread scheduler and a clock once the first thread identifier of the first thread suspended pending the first activity has been transmitted to the first port and the second thread identifier of the second thread suspended pending the second activity has been transmitted to the second port.

12. A processor according to claim 11, wherein the processor is adapted to power up said at least one of the execution unit, thread scheduler and clock upon return of at least one of the first thread identifiers from the first port and the second thread identifier from the second port.

13. A processor according to claim 1, wherein the first port comprises first activity handling logic and is associated with at least one first condition register for storing a first condition, the first activity handling logic being arranged to monitor the first activity at the first port and to generate said first indication in dependence on said first activity fulfilling said first condition.

14. A processor according to claim 13, wherein the second port comprises second activity handling logic and is associated with at least one second condition register for storing a second condition, the second activity handling logic being arranged to monitor the second activity at the second port and to generate said second indication in dependence on said second activity fulfilling said second condition; and the execution unit is arranged to transmit the first condition to the first condition register and the second condition to the second condition register.

15. A processor according to claim 1, further comprising a program memory connected to the execution unit by a bus, wherein the thread scheduler is connected to receive said first indications from the first port and the second indication from the second port by at least one connection separate from said bus.

16. A processor according to claim 1, further comprising a plurality of sets of thread registers, each of said sets of thread registers being allocated to store information relating to a respective one of said multiple threads.

17. A processor according to claim 16, further comprising at least one channel between at least two of said sets of thread registers, wherein the thread scheduler is adapted to schedule one of said multiple threads based on activity occurring over said channel.

18. A processor according to claim 1, wherein the processor is implemented on a chip and at least one of said first and second ports is an internal port for communicating with another processor on said chip.

19. A processor according to claim 1, wherein the processor is implemented on a chip and at least one of said first and second ports is an external port for communicating with a device external to said chip.

20. A processor according to claim 19, wherein the external port is a pin port for detecting rising or falling signal edges occurring at a pin at the chip's physical boundary.

21. A processor according to claim 19 or 20, wherein said first and second ports are external ports and at least one of said external ports is a data port for handling an instantaneous logic-level of one or more bits at the port.

22. A processor according to claim 1, wherein the execution unit is adapted to recognise and execute dedicated instructions for suspending and running threads.

23. A processor according to claim 1, wherein the thread scheduler is additionally adapted to schedule one of said multiple threads based on an interrupt.

24. A processor according to claim 23, wherein said multiple threads scheduled based on the interrupt comprises the first thread, and the interrupt interrupts the first thread whilst suspended.

25. A processor according to claim 1, wherein the thread scheduler is adapted to schedule the first thread without suspension if an associated activity occurs on or before execution of an instruction within the first thread which is dependent on the first activity.

26. A method of scheduling multiple threads for execution within a processor having a first port and a second port, said ports being operable for inputting data to or outputting data from the processor, the multiple threads comprising a first thread and a second thread, and the method comprising:
   associating the first thread with a first activity at the first port and associating the second thread with a second activity at the second port;
   generating a first indication at the first port in dependence on the first activity;
   generating a second indication at the second port in dependence on the second activity; and
   scheduling the multiple threads for execution based on the first indication and the second indication, by suspending execution of the first thread pending receipt of the first indication and suspending execution of the second thread pending receipt of the second indication; and
   running the multiple threads by performing said execution of the multiple threads in dependence on said scheduling.

27. A method according to claim 26, further comprising transmitting, to an identifier register associated with the first port, a first thread identifier relating to the first thread suspended pending the first activity.

28. A method according to claim 27, further comprising transmitting, to an identifier register associated with the second port, a second thread identifier relating to the second thread suspended pending the second activity.

29. A method according to claim 28, further comprising:
   once the first thread identifier of paused the first threads suspended pending the first activity has been transmitted to the first port and the second thread identifier of the second thread suspended pending the second activity has been transmitted to the second port, powering down at least one of: an execution unit used to execute said threads, a thread scheduler used to schedule said threads, and a clock.

30. A method according to claim 29, further comprising: upon return of at least one of the first thread identifier from the first port and the second thread identifier from the second port, powering up said at least one of the execution unit, thread scheduler and clock.

31. A method according to claim 26, wherein the first port comprises first activity handling logic and is associated with at least one first condition register for storing a first condition, the method further comprising using the first activity handling logic to monitor the first activity at the first port and to generate said first indication in dependence on said first activity fulfilling said first condition.

32. A method according to claim 31, wherein the second port comprises second activity handling logic and is associated with at least one second condition register for storing a second condition, the method further comprising using the second activity handling logic to monitor the second activity at the second port and to generate said second indication in dependence on said second activity fulfilling said second condition, and wherein the method further comprises transmitting the first condition to the first condition register and transmitting the second condition to the second condition register.

33. A method according to claim 26, wherein the processor comprises memory connected to the execution unit by a bus, and the method further comprises transmitting the first indication from the first port and the second indication from the second port by at least one connection separate from said bus.

34. A method according to claim 26, further comprising transmitting a continuation point vector, upon suspending said first thread, to a vector register associated with the first port; and returning the continuation point vector in dependence on the first activity.

35. A method according to claim 34, comprising associating the first thread with activity from a plurality of ports; respective activity being from a respective one of the plurality ports; and transmitting, to each respective one of the plurality of ports, a respective one of a plurality of continuation point vectors, each respective one of the plurality of continuation point vectors being returned from the respective port in dependence on the respective activity; wherein said scheduling comprises suspending the execution of the first thread until return of at least one of the plurality of continuation point vectors.

36. A method according to claim 34, comprising enabling said first activity to trigger said scheduling of the first thread by asserting a port event enable flag, and disabling said first activity from triggering said scheduling by de-asserting the port event enable flag.

37. A method according to claim 36, comprising enabling the first thread to be scheduled in dependence on the first activity by asserting the thread event enable flag, and disabling the first thread from being scheduled in dependence the first activity by de-asserting the thread event enable flag.

38. A method according to claim 37, comprising de-asserting at least one of the port event enable flag and the thread event enable flag automatically by occurrence of the first activity.

39. A method according to claim 37, further comprising:
   after de-asserting at least one of the port event enable flag and the thread event enable flag, resuming execution of the first thread and subsequently suspending execution of the first thread pending a third indication of a third activity from a port whilst said at least one of the port event enable flag and the thread event enable flag is de-asserted;
   re-asserting said at least one of the port event enable flag and the thread event enable flag; and after re-asserting said at least one of the port event enable flag and the thread event enable flag, suspending execution of the first thread pending a re-occurrence of the first activity.

40. A method according to claim 37, wherein a plurality of respective port event enable flags are associated with each of the plurality of ports associated with the first thread; and the method comprises asserting the thread enable flag and subsequently asserting said plurality of port event enable flags.

41. A method according to claim 26, further comprising storing information representing each of said multiple threads in a respective set of thread registers.

42. A method according to claim 41, wherein the processor further comprises at least one channel between at least two of said sets of thread registers, and the method comprises scheduling one of said multiple threads based on activity occurring over said channel.

43. A method according to claim 26, wherein the processor is implemented on a chip and at least one of said first port and said second port is an internal port for communicating with another processor on said chip.

44. A method according to claim 26, wherein the processor is implemented on a chip and at least one of said first port and said second ports is an external port for communicating with a device external to said chip.

45. A method according to claim 44, wherein at least one external port is a pin port for detecting rising or falling signal edges occurring at a pin at the chip's physical boundary.

46. A method according to claim 44 or 45, wherein at least one external port is a data port for handling an instantaneous logic-level of one or more bits at the port.

47. A method according to claim 26, further comprising executing dedicated instructions for suspending and running the multiple threads.

48. A method according to claim 26, additionally comprising scheduling a one of said multiple threads based on an interrupt.

49. A method according to claim 48, wherein the one of said multiple threads scheduled based on the interrupt is the first thread, and the interrupt interrupts the first thread whilst suspended.

50. A method according to claim 26, comprising scheduling the first thread without suspension if the first activity occurs on or before execution of an instruction within that the first thread which is dependent on that the first activity.

51. A thread scheduler for scheduling multiple threads for execution within a processor having a first port and a second port, said ports being operable for inputting data to or outputting data from the processor, the multiple threads comprising a first thread and a second thread, wherein:
the thread scheduler is adapted to receive a first indication generated by the first port dependent on a first activity at the first port;
the thread scheduler is adapted to receive a second indication generated by the second port dependent on a second activity at the second port; and
the thread scheduler is adapted to schedule said multiple threads for execution by an execution unit based on the first indication and the second indication, by suspending execution of the first thread pending receipt of the first indication and suspending execution of the second thread pending receipt of the second indication;
wherein the first activity is associated with the first thread and the second activity is associated with the second thread.

52. A port for use in scheduling of multiple threads for execution, the port being operable for inputting data to or outputting data from a processor, comprising:
activity handling logic arranged to generate an indication dependent on activity at the port, the activity comprising input of data to the port;
a register for storing information identifying a thread associated with said activity; and
a register for storing a condition;
wherein the activity handling logic is adapted to compare the data against the condition, to transmit the indication on chip when said activity meets said condition, and to thereby perform a conditional input of data via the port to one of said multiple threads.

53. A mobile terminal having a mobile applications processor, at least one peripheral device, and an interface processor connected between the mobile applications processor and the peripheral device, the interface processor comprising:
a first port for inputting data to or outputting data from the processor and being operable to generate a first indication dependent on a first activity at the first port;
a second port for inputting data to or outputting data from the processor and being operable to generate a second indication dependent on a second activity at the second port;
an execution unit arranged to execute multiple threads, the multiple threads comprising a first thread and a second thread; and
a thread scheduler connected to receive the first indication and the second indication, and arranged to schedule said multiple threads for execution by the execution unit based on the first indication and the second indications, by suspending execution of the first thread pending receipt of the first indication and suspending execution of the second thread pending the second indication;
wherein the first activity is associated with the first thread and the second activity is associated with the second thread.

54. An array of interconnected processors, at least one of said processors comprising:
a first port for inputting data to or outputting data from the processor and being operable to generate a first indication dependent on a first activity at the first port;
a second port for inputting data to or outputting data from the processor and being operable to generate a second indication dependent on a second activity at the second port;
an execution unit arranged to execute multiple threads, the multiple threads comprising a first thread and a second thread; and
a thread scheduler connected to receive the first indication and the second indication and arranged to schedule said multiple threads for execution by the execution unit based on the first indication and the second indication, by suspending execution of the first thread pending receipt of the first indication and suspending execution of the second thread pending receipt of the second indication;
wherein the first activity is associated with the first thread and the second activity is associated with the second thread; and
at least one of said first port and said second port connects said at least one processor with another processor in the array.

55. A processor comprising:
first port means to generate a first indication dependent on a first activity at the first port;

second port means for generating a second indication dependent on a second activity at the second port;

execution means for executing multiple threads, the multiple threads comprising a first thread and a second thread; and thread scheduling means for receiving said first indication and said second indication and arranged to schedule said multiple threads for execution by the execution means based on the first indication and the second indication, said scheduling including suspending execution of the first thread pending receipt of the first indication and suspending execution of the second thread pending receipt of the second indication;

wherein the first activity is associated with the first thread and the second activity is associated with the second thread.

56. A thread scheduler for scheduling multiple threads for execution within a processor having a first port and a second port, each port for inputting data to or outputting data from the processor, the multiple threads comprising a first thread and a second thread, and the thread scheduler comprising:

means for receiving a first indication generated by the first port dependent on a first activity at that first port;

means for receiving a second indication generated by the second port dependent on a second activity at that second port; and means for scheduling said multiple threads for execution by the processor based on the first indication and the second indication, said scheduling including suspending execution of the first thread pending receipt of the first indication and suspending execution of the second thread pending receipt of the second indication;

wherein the first activity is associated with the first thread and the second activity is associated with the second thread.

* * * * *